Patented Jan. 25, 1927.

1,615,751

UNITED STATES PATENT OFFICE.

GORDON S. FULCHER, OF CORNING, NEW YORK, ASSIGNOR TO CORNING GLASS WORKS, OF CORNING, NEW YORK, A CORPORATION OF NEW YORK.

CAST REFRACTORY PRODUCT.

No Drawing. Application filed July 27, 1926, Serial No. 125,327, and in Great Britain June 25, 1926.

In my application Serial No. 641,753, filed May 26, 1923, I disclose a crystalline refractory casting analytically containing silica, alumina, and zirconia, made by fusing a mixture of raw materials containing alumina, silica and zirconia, with or without an alkali, and casting the fused mass into shapes in which it is desired to use the refractory.

In my other application Serial No. 47,381, filed July 31, 1925, I have disclosed a process of obtaining a cast annealed refractory article.

I have discovered that the presence of a zirconium compound in a refractory casting exercises beneficial effects on the annealing thereof, in that it lowers the possible annealing range and this apart from the other valuable properties due to the zirconium compound in modifying the characteristics of the unannealed product. The purpose of this application is to cover an annealed cast refractory article containing a zirconium compound.

In my aforesaid application, Serial No. 641,753, I have specifically disclosed refractories of the following analytical composition:—

|  | I. | II. | III. | IV. | V. | VI. |
|---|---|---|---|---|---|---|
| $SiO_2$ | 29.0 | 30.0 | 34.0 | 38.0 | 32.5 | 35.0 |
| $Al_2O_3$ | 51.0 | 42.0 | 34.0 | 35.5 | 39.0 | 30.0 |
| $ZrO_2$ | 18.0 | 25.5 | 30.0 | 13.5 | 19.0 | 25.0 |
| $Na_2O$ |  |  |  | 10.5 | 7.0 | 7.5 |
| $TiO_2$, $Fe_2O_3$ etc. | 2.0 | 2.5 | 2.0 | 2.5 | 2.5 | 2.5 |

Annealed castings have also been made with up to 60% zirconia. In general the higher the zirconia, the lower the expansion.

Good results have been obtained with up to 60% zirconia, but for my present purposes the zirconia content should amount to at least 10%. The quantity of alkali present should be limited, and should not be over 15%.

Raw materials of the desired batch may, in carrying out my invention, be melted in an electric furnace, and when fused, cast into shapes of desired form for use as refractories, the resulting castings being annealed in any appropriate manner, such for instance as burying them in sand. Several methods of annealing are disclosed in my previous application, Serial No. 47,381. The resulting product will consist of crystals embedded in a glassy matrix, the crystals varying in size in accordance with the conditions of manufacture and with the batch used. In certain circumstances the crystals are microscopic, and the matrix may constitute a substantial proportion of the refractory. The introduction of the zirconium compound results in a much finer crystal structure than would otherwise be the case, and permits the satisfactory manufacture of refractories in which the molecular ratio of silica to the sum of zirconia plus two-thirds alumina is less than one. In the absence of the zirconia, the refractories containing a less ratio of silica to alumina than two to three are apt to be brittle, and are difficult to anneal. The zirconia content facilitates the annealing by lowering the annealing range of the matrix in which the crystals are contained.

It is usual to give the analytical composition of substances such as form the subject-matter of this application in the percentage of oxides of the various elements present therein. Hence in certain of the following claims in which the term "analytically containing" is used, I have specified the presence of the oxides of certain elements without intending to limit the claims to the presence of such elements in the condition of free oxides, but merely to indicate the presence of compounds of such elements in quantities which, when determined as oxides, give the percentage called for.

The word "casting" in the following claims is used to define an article which has been cast or formed by running molten material into a mold of any desired form, and the term "refractory casting" is used to designate a casting which, when used in a furnace of high temperature, will for a prolonger period, successfully withstand the temperatures encountered, and will resist the abrasion and corrosion at the places where used.

Having thus described my invention what I claim as new, and desire to secure by Letters Patent is:—

1. An annealed refractory casting analytically containing a compound of zirconium in substantial quantities, and consisting of indigenous crystals in a glassy matrix.

2. An annealed refractory casting analytically containing zirconia in an amount between 10% and 60%, and consisting of indigenous crystals in a glassy matrix.

3. An annealed refractory casting analytically containing between 10 to 60% zirconia, and silica and alumina.

4. An annealed refractory casting analytically containing a substantial quantity of zirconia, and alumina, and silica, and in which the number of molecules of silica is less than the sum of the number of molecules of zirconia plus two-thirds of the number of molecules of alumina.

5. An annealed refractory casting analytically containing zirconia between 10% and 60%, and containing alumina and silica in a ratio greater than 3 to 2.

In testimony whereof I hereunto affix my signature.

GORDON S. FULCHER.